United States Patent [19]
Evans

[11] 3,973,782
[45] Aug. 10, 1976

[54] ECCENTRICITY COMPENSATING SEAL
[75] Inventor: Bryce B. Evans, Jackson, Mich.
[73] Assignee: Aeroquip Corporation, Jackson, Mich.
[22] Filed: Jan. 10, 1975
[21] Appl. No.: 539,962

[52] U.S. Cl. .............................. 277/142; 277/159; 277/212 F
[51] Int. Cl.² ...................... F16J 15/32; F16K 41/00
[58] Field of Search ........... 277/142, 143, 149, 159, 277/178, 212 R, 212 F, 40, 48

[56] References Cited
UNITED STATES PATENTS

| | | | |
|---|---|---|---|
| 1,040,308 | 10/1912 | Godley | 277/212 F |
| 2,202,908 | 6/1940 | Hubbard | 277/48 |
| 2,668,067 | 2/1954 | Fitzsimmons | 277/212 F |
| 2,781,208 | 2/1957 | Foss | 277/212 R |
| 2,998,987 | 9/1961 | Taschenberg et al. | 277/137 |
| 3,405,948 | 10/1968 | Junker | 277/142 |

Primary Examiner—Richard E. Aegerter
Assistant Examiner—L. Footland
Attorney, Agent, or Firm—Beaman & Beaman

[57] ABSTRACT

A seal for fluid tight sealing between a shaft and a member having an opening through which the shaft extends. The member includes a sealing surface perpendicularly disposed to the shaft axis and the seal is of a homogeneous "right angle" construction having hub and flange portions. An inwardly extending continuous lip establishes a seal between the hub and shaft, while an annular ridge defined on the flange engaging the member sealing surface sealingly engages the surface whereby a sealed relationship exists between the shaft and member regardless of the presence of eccentricity therebetween during shaft rotation or linear displacement. Seal positioning means maintain the flanged ridge in engagement with the member sealing surface and annular spring means are employed upon the hub to bias the lip into engagement with the shaft.

3 Claims, 5 Drawing Figures

ECCENTRICITY COMPENSATING SEAL

BACKGROUND OF THE INVENTION

The invention pertains to eccentricity compensating seals interposed between shafts and planar sealing surfaces such as a gland surface.

Fluid type seals capable of compensating for slight eccentricites between a shaft and a gland member are known wherein sufficient clearances exist to permit relative radial displacement between the seal and its associated members. Also, it is known to use spring biasing means to augment the resilient characteristics of the seal, as shown in U.S. Pat. No. 2,193,326, and synthetic plastic seals have been constructed of materials having excellent wear-resisting qualities, as well as a resistance to corrosion, and such seals have been known to utilize lips or flanges to augment sealing, as shown in U.S. Pat. Nos. 2,998,987 and 3,380,745.

While a wide variety of seal constructions provide effective sealing between a shaft and associated member, with either respective rotating or reciprocating motions, known seal constructions wherein significant eccentricity exists during shaft movement, either rotary or linear, often are not capable of maintaining effective sealing over extended durations.

The presence of eccentric shaft movement causes relative movement between the seal surfaces and the surfaces engaged thereby, causing wear on the seal surfaces which, eventually, destroys effective sealing. Also, resilient forces imposed upon the seal to maintain engagement between relatively moving components often vary if such forces are produced by the resilient nature of the seal material.

Further, with a linearly displaceable shaft the axial forces imposed upon the restrained seal mechanism produce wear in the seal and it is difficult to maintain an effective sealing seal efficiency over extended periods of time.

SUMMARY OF THE INVENTION

It is an object of the invention to provide a seal for rotary or linearly movable shafts capable of maintaining an effective seal even though substantial eccentricity exists during shaft movement between the shaft and fixed sealing surfaces such as a gland surface.

Another object of the invention is to provide a fluid type seal for eccentrically movable shafts capable of maintaining effective sealing characteristics for an extensive time duration.

Another object of the invention is to provide a seal for eccentrically movable shafts wherein sealing is maintained during linear or rotative movement of the shaft, or a combination thereof, and biasing forces are employed to maintain resilient engagement between the wear-resistant seal material and the shaft and gland sealing surface.

The seal of the invention is of a right angle or L-type partial cross section wherein the seal includes an annular hub portion from which radially depends a flange portion. The two portions of the seal are homogeneously formed and the hub includes a continuous inwardly disposed lip adjacent one end which sealingly engages the shaft surface. An annular ridge is defined upon the flange concentrically radially spaced from the hub and engages a flat surface on the gland. The ridge is homogeneously formed from the seal flange material.

Biasing means, in the form of an annular spring circumscribes the hub to impose an inward biasing force on the portion of the hub adjacent the lip, and is also intended that biasing means be imposed upon the flange to bias the ridge into engagement with the gland sealing surface.

A retaining member in the form of a cup which may be press fitted into a gland recess engages an annular glider which maintains the flange and seal material in position. The retainer includes a flat radial surface upon which the glider may be radially displaced during eccentric movement between the hub, upon which the glider is mounted, and the retainer.

Modifications of the invention are shown wherein various types of deflection of the flange ridge are disclosed.

BRIEF DESCRIPTION OF THE DRAWINGS

The aforementioned objects of the invention will be appreciated from the following description and the accompanying drawings wherein.

DESCRIPTION OF THE PREFERRED EMBODIMENTS

Figure 1:
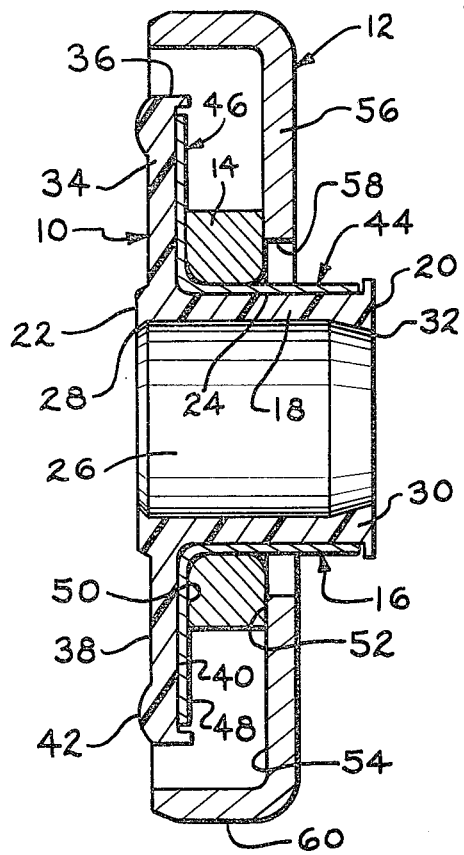
FIG. 1 is a diametrical, elevational, sectional view of the preferred embodiment of the seal in accord with the invention, the seal being shown in its normal, undeformed state prior to assembly upon the shaft and within the gland recess.
Figure 2:
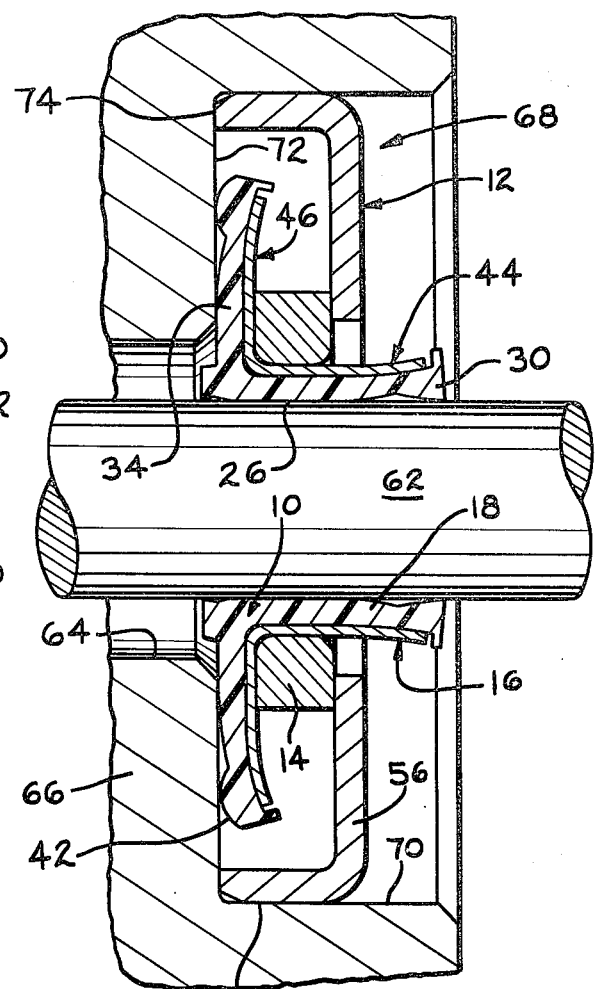
FIG. 2 is a diametrical, elevational, sectional view of the seal as mounted upon a shaft and within a gland recess, the seal components being deformed into their operative relationships.
Figure 3:
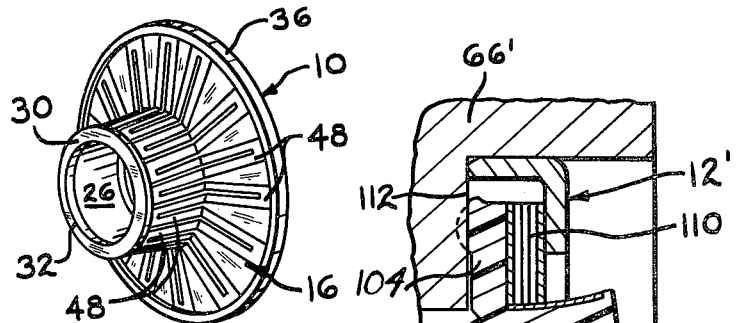
FIG. 3 is a perspective view of the seal hub and flange and cantilever spring components.

FIGS. 1 through 3 illustrate a commercial form on the invention, and a complete seal assembly includes a seal body 10, a cup-shaped retainer 12, an annular glider 14, and a spring 16.

With reference to FIGS. 1 and 3, the seal body 10 has a free or normal configuration as illustrated. The seal body is formed of a wear-resistant, resilient material and is preferably formed of fluorinated ethylene-propylene resin commonly sold under the trademark "Teflon". However, it will be appreciated that other materials may be used, such a rubber, or rubber-like compositions.

The seal body 10 includes a cylindrical hub 18 having ends 20 and 22. The hub 18 is provided with a cylindrical exterior surface 24 and a cylindrical bore or internal opening 26. As will be noted from FIG. 1, the left end 22 of the hub 18 is provided with a continuous homogeneous inwardly disposed lip 28 having a minimum diameter less than the diameter of the opening 26. A lip 30 is formed at the end 20 of the hub of a greater radial and axial dimension than lip 28 and also extends inwardly within the projection of the opening 26 forming a minimum diameter at the annular edge 32. The lip 30 is of a continuous configuration and is of a diameter at edge 32 less than that of opening 26 and the diameter of the shaft with which the seal is to be employed.

A radially extending flange 34 extends from the hub 18 adjacent the end 22 and the flange is of a circular configuration terminating at periphery 36. The flange 34 is also defined by radially extending side surfaces 38 and 40 and an annular ridge 42 is defined upon the side 38, extending from the plane thereof in a direction away from the hub end 20. In its normal state the plane of the flange 34 is perpendicular to the axis of the hub 18 and the opening defined therein.

An annular right angle or L-shaped double acting cantilever spring 16 is employed to "back up" the hub and the flange, and provides additional biasing forces during deformation of these elements of the seal body. As will be appreciated from FIGS. 1 and 3, the spring 16 includes an axial portion 44 disposed about and closely engaging the hub surface 24 and the radially extending portion 46 directly engages the flange side 40, and the radial length of the portion 46 is in axial alignment with the ridge 42. The spring portions 44 and 46 are defined by a plurality of cantilevered spring elements 48 formed in a zig-zag manner, as will be appreciated from FIG. 3.

The seal is maintained in the desired relationship to the gland through the annular glider 14 and the retainer 12. The glider ring 14 includes an inner cylindrical surface engaging the axial spring portion 44, a radial surface 50 engaging radial spring portion 46, and a radial surface 52 of a planar configuration engaging the inner radial surface 54 of the retainer cup 12. The retainer cup radial portion 56 includes a coaxial opening 58 of a diameter significantly greater than the diameter of the hub 18 and the spring portion 44, the diameter of the opening 58 being sufficient to accommodate the maximum eccentricity expected between the shaft and the gland member without engagement of the retainer opening with the spring portion 44. The periphery of the retainer 12 as defined by a cylindrical portion having a cylindrical surface 60 of an accurately dimensioned size.

The assembly of the seal in accord with the invention with a shaft and gland will be appreciated from FIG. 2. In assembly, the shaft 62, which may either be of the rotating or linearly movable type, or both, is located within an opening 64 within gland member 66. The gland 66 may constitute a housing, or other structural component through which the shaft 62 passes and the gland is not to be interpreted as any particular type of component. Of course, the diameter of the gland opening 64 will be sufficient to accommodate any eccentricity which may occur between the shaft and the gland opening.

The seal is received within the recess 68 defined in the gland which is formed by the cylindrical surface 70 and the sealing surface 72 disposed at right angles to the axis of the opening 64 and the shaft 62. The diameter of the recess surface 70 and the retainer peripheral surface 60 is such that a press fit exists when the retainer 12 is forced into the recess 68. Upon the retainer end 74 engaging the surface 72, the axial dimension of the glider 14, spring element thickness, and the axial dimension of the flange 34 causes the ridge 42 to engage the surface 72 and the flange is deformed to the right against the biasing force of the spring portion 46.

As the diameter of the shaft 62 is greater than the minimum diameter of the lip 28 and the lip 30, the entrance of the shaft into the seal body opening 26 will cause radially outward deformation of the lips and produce a radial deformation of the spring portion 44, and hub 18, as shown in FIG. 2. The close fit between the lips 28 and 30 and the shaft 62, and the biasing action inwardly produced by the spring 16 prevents fluid from seeping between the hub and the shaft.

As will be appreciated from FIG. 2, the gland recess surface 72 engages the flange side 38 and at the ridge 42. Lateral movement of the shaft 62 within the opening 64 due to eccentricity of shaft rotation, or due to other lateral forces imposed upon the shaft, will cause the seal and flange to shift in a radial direction on the surface 72. However, under the influence of the spring 16 a sealing engagement at surface 72 will exist between the flange and gland and there will be no fluid flow along the surface 72 in a radial direction. Of course, lateral movement of the seal and shaft will, also, radially displace the glider ring 14 with respect to the retainer portion 56, and the engagement of the surfaces 52 and 54 will be maintained at all lateral positions of the glider ring.

The seal in accord with the invention has proven to be most effective for producing an effective seal for extended periods of time even though subjected to high degrees of eccentricity between the shaft and the gland. By varying the thickness of the material forming the spring portions 44 and 46 the biasing load imposed upon the hub 18 and the flange 34 may be varied depending on the type of surface engaged by these components, and variations in the axial width of the glider ring 14, and the flange 34 will also permit a close control of the forces existing in the deformation produced in the seal components.

Figure 4:
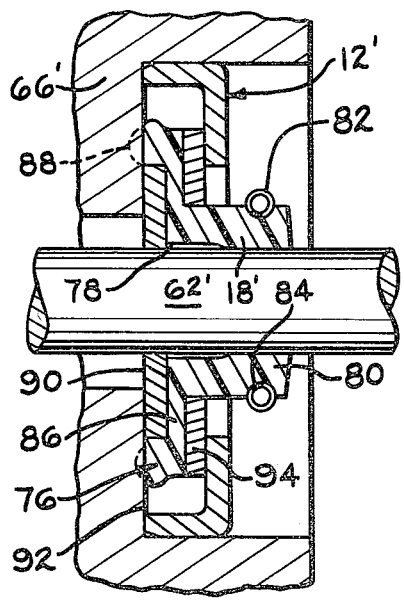
FIG. 4 is a diametrical, elevational, sectional view of a variation of seal in accord with the invention, the normal undeformed configuration of the flange ridge being shown in dotted lines.
Figure 5:
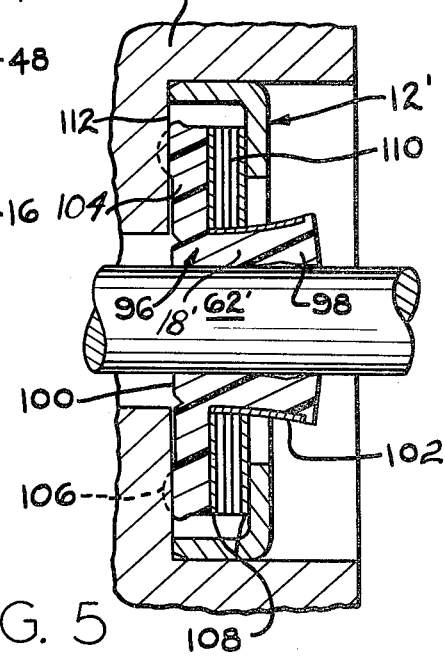
FIG. 5 is another diametrical cross-sectional view of a further embodiment of a seal utilizing the inventive concepts, the undeformed condition of the ridge being shown in dotted lines.

Variations in seals constructed in accord with the invention, but employing the basic inventive concepts, are shown in FIGS. 4 and 5 wherein primed reference numerals are used to indicate components similar to those described.

In FIG. 4 the elastomer seal body 76 includes an opening 78 and an inwardly disposed lip 80 which is biased inwardly by an annular tension spring 82 received within a groove 84. The spring 82 may be of the type commonly known as a "garter" spring. The body 76 is preferably formed of an elastomer, such as rubber, teflon, neoprene, etc., and includes a radially extending flange 86 provided with the ridge 88 which, in its normal form, extends to the right as shown in the dotted lines of FIG. 4. The flange 86 is provided with a recess into which the annular back up ring 90 is received and the back up ring fits tight to the shaft and engages the gland sealing surface 92. The back up ring of rigid material remains tight to the shaft 62' while sliding along surface 92 preventing extrusion of the seal material providing the capability to handle high pressure.

The retainer 12' engages an annular glider ring 94 disposed about the hub 18', and engages the flange, and the axial dimensions of the seal components are such that when the seal is assembled in the gland recess the ridge 88 is deformed such as to produce a radial "bulge" and the ridge will be held in intimate sealing relationship with the sealing surface 92. Of course, the lip 80 is of a continuous annular configuration to prevent fluid flow past the seal along shaft 62' and the described seal provides effective sealing regardless of the existence of eccentric or lateral movement of the seal body with respect to the gland.

In FIG. 5, the seal body 96 is preferably formed of an elastomer material of the aforedescribed type and includes an axial hub portion 18' having a continuous annular lip 98. Also, a lip 100 is formed at the left end of the hub similar to the hub lip shown in FIG. 1.

The hub 18' is circumscribed by a spring member 102 which is capable of circumferentially expanding in order to permit the shaft 62' to enter the hub opening. The radial flange 104 is provided, in its free form, with an annular ridge 106 which extends to the left from the flange to the extent shown in dotted lines in FIG. 5. The opposite side of the flange is supported by a pair of annular slides 108 having a wave spring 110 interposed therebetween. The wave spring 110 is of a conventional type being formed with a sinuous or sine wave configuration whereby press fitting the retainer 12' into the gland recess 68' compresses the wave spring between the slides 108 and deforms the material of the ridge 106 inwardly toward the flange, and outwardly. Thus, it will be appreciated that in this embodiment a tight sealing relationship exists between the flange 104 and the sealing surface 112 which permits lateral movement of the flange relative to the sealing surface without adversely affecting the efficiency of the seal. The presence of the wave spring 110 will maintain an effective biasing force upon the flange in reaction to the compression of the ridge material and, as the ridge material wears, the wave spring will compensate for such occurence.

It is appreciated that various modifications to the inventive concept may be apparent to those skilled in the art without departing from the spirit and scope of the invention.

I claim:

1. In combination, a cylindrical shaft, a member including an opening receiving said shaft, said opening being intersected by a sealing surface defined on said member perpendicularly disposed to the shaft length, a seal body having an annular configuration and including an opening of a diameter to receive said shaft, said body including an annular axially extending hub portion concentric to and defining said body opening and having an end and an annular flange portion radially extending outwardly from said axially extending hub portion having radially disposed sealing surface and spring engaging side surfaces and an outer periphery, said portions being in sealed fluid-tight relationship to each other and formed of resilient wear-resistant material, an annular continuous lip defined on said axially extending hub portion adjacent said end and extending radially inwardly and defining a circumferential portion of said body opening, said lip having a minimum inner diameter less than the diameter of said shaft whereby placing said seal body on said shaft deforms said lip and axially extending hub portion radially outwardly, a continuous annular ridge defined on said flange portion sealing surface engaging side surface projecting axially therefrom and radially spaced from said axially extending hub portion, an annular spring mounted upon said seal body, said spring including a plurality of axially extending cantilevered resilient elements disposed about and engaging the circumference of said axially extending hub portion and a plurality of radially extending cantilevered resilient elements engaging said spring engaging side surface of said flange portion whereby said resilient elements deform under the deformaton of said lip and flange, respectively, a substantially rigid annular ring circumscribing said spring and said hub portion engaging said axially and radially extending cantilevered resilient elements adjacent the intersection of said hub portion and said flange portion, said ring having an axial length less than that of said hub portion and a radial dimension less than that of said flange portion whereby said resilient elements may freely deform adjacent said lip and ridge, and an annular retainer circumscribing said hub portion mounted upon said member having a ring-engaging surface in spaced parallel relationship to said member sealing surface engaging said ring and maintaining said ring in engagement with said resilient elements and so spaced from said sealing surface as to maintain said ridge in a sealed relationship with said sealing surface.

2. In a combination as in claim 1, an annular recess defined in said member concentric with said member opening, said recess being defined by a cylindrical surface concentric to the axis of said member opening and said sealing surface, said retainer being of a cup-like configuration including a cylindrical periphery closely fitted within said recess cylindrical surface.

3. In a combination as in claim 1 wherein said axially extending hub and flange portions are homogeneously formed of a synthetic plastic resilient material.

* * * * *